(12) United States Patent
Shao et al.

(10) Patent No.: US 12,140,275 B2
(45) Date of Patent: Nov. 12, 2024

(54) METHOD FOR GAS GATE STATION MONITORING BASED ON SMART GAS PLATFORM AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yongzeng Liang, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/414,397

(22) Filed: Jan. 16, 2024

(65) Prior Publication Data

US 2024/0153374 A1    May 9, 2024

(30) Foreign Application Priority Data

Nov. 30, 2023    (CN) .......................... 202311621240.9

(51) Int. Cl.
*F17D 5/02* (2006.01)
*F17D 5/00* (2006.01)
(Continued)

(52) U.S. Cl.
CPC ............... *F17D 5/02* (2013.01); *F17D 5/005* (2013.01); *F17D 5/00* (2013.01); *G01D 2204/22* (2021.05); *G01F 15/00* (2013.01); *G01M 3/2807* (2013.01)

(58) Field of Classification Search
CPC ........ F17D 5/02; F17D 5/005; G01D 2204/22
See application file for complete search history.

(56) References Cited

U.S. PATENT DOCUMENTS 9,395,262 B1 *  7/2016  Kumar ................ G01M 3/2815
9,599,531 B1 *  3/2017  Chaudhary .......... G01M 3/2807
(Continued)

FOREIGN PATENT DOCUMENTS

CN          205263600 U      5/2016
CN          110471333 A     11/2019
(Continued)

OTHER PUBLICATIONS

Urban Natural Gas Transmission and Distribution System, Web page <https://baike.baidu.com/item/%E5%9F%8E%E9%95%87%E5%A4%A9%E7%84%B6%E6%B0%94%E8%BE%93%E9%85%8D%E7%B3%BB%E7%BB%9F/22052481>, 2024, 25 pages.
(Continued)

*Primary Examiner* — Andrew W Bee
(74) *Attorney, Agent, or Firm* — METIS IP LLC

(57) ABSTRACT

Method and an IoT system for gas gate station monitoring are provided. The method includes obtaining operation data of a gas gate station; obtaining a downstream user feature corresponding to the gas gate station and historical warning data corresponding to the gas gate station; determining, based on the downstream user feature and the historical warning data and in combination with the operation data, the associated node in a preset time period, the associated node including at least one of a gate station internal node and an external pipeline network node; obtaining monitoring data of the associated nodes, the monitoring data at least including node monitoring data of the gate station internal node and node monitoring data of the external pipeline network node; and issuing a warning notification in response to the monitoring data not satisfying a preset condition.

10 Claims, 4 Drawing Sheets

(51) Int. Cl.
    *G01F 15/00*     (2006.01)
    *G01M 3/28*     (2006.01)

(56) References Cited

U.S. PATENT DOCUMENTS 11,838,704 B1 * 12/2023 Fu .......................... H04Q 9/00
2019/0303807 A1   10/2019 Gueye

FOREIGN PATENT DOCUMENTS

| | | |
|---|---|---|
| CN | 209946697 U | 1/2020 |
| CN | 112068456 A | 12/2020 |
| CN | 112884250 A | 6/2021 |
| CN | 215599517 U | 1/2022 |
| CN | 115355447 A | 11/2022 |
| CN | 115775088 A | 3/2023 |
| CN | 115936722 A | 4/2023 |
| CN | 116503229 A | 7/2023 |
| CN | 117093883 A | 11/2023 |

OTHER PUBLICATIONS

Chen, Ronghua et al., Intelligent Gas Station Management Mode, China State-Owned Enterprise Management, 2022, 9 pages.

* cited by examiner

METHOD FOR GAS GATE STATION MONITORING BASED ON SMART GAS PLATFORM AND INTERNET OF THINGS SYSTEM THEREOF

CROSS REFERENCE TO RELATED APPLICATIONS

This application claims priority of Chinese Patent Application No. 202311621240.9, filed on Nov. 30, 2023, the content of which is entirely incorporated herein by reference.

TECHNICAL FIELD

The present disclosure relates to the field of gas gate station monitoring, and in particular relates to a method and an Internet of Things (IoT) system for gas gate station monitoring based on a smart gas platform.

BACKGROUND

Due to demands of gas pipeline network management, staff of a gas gate station demands to monitor a great amount of gas data in order to ensure a safe operation of the gas pipeline network. In order to efficiently monitor, a great amount of manpower cost is often required. In addition, due to a high correlation of the gas pipeline network, a minor hidden danger may affect the operation of the gas pipeline network in a whole area, making a pressure of operation higher. The gas gate station may also cause a certain amount of noise pollution, affecting the staff's health.

There is therefore an urgent need to propose a method and an IoT system for gas gate station monitoring based on a smart gas platform, which reduces an involvement of personnel and at the same time ensures timeliness and accuracy of warning.

SUMMARY

One of the embodiments of the present disclosure provides a method for gas gate station monitoring based on a smart gas platform implemented by a smart gas safety management platform, including: obtaining operation data of a gas gate station; dynamically determining an associated node related to the gas gate station, the associated node including at least one of a gate station internal node and an external pipeline network node. The dynamically determining an associated node related to the gas gate station may include: obtaining a downstream user feature corresponding to the gas gate station and historical warning data corresponding to the gas gate station; and determining, based on the downstream user feature and the historical warning data and in combination with the operation data, the associated node in a preset time period.

One of the embodiments of the present disclosure provides an Internet of Things (IoT) system for gas gate station monitoring based on a smart gas platform. The IoT system may include a smart gas user platform, a smart gas service platform, a smart gas safety management platform, a smart gas device sensor network platform, and a smart gas pipeline network device object platform. The smart gas safety management platform may be configured to: obtain operation data of a gas gate station; dynamically determine an associated node related to the gas gate station, the associated node including at least one of a gate station internal node and an external pipeline network node. To dynamically determine an associated node related to the gas gate station, the smart gas safety management platform may be further configured to: obtain a downstream user feature corresponding to the gas gate station and historical warning data corresponding to the gas gate station; and determine, based on the downstream user feature and the historical warning data and in combination with the operation data, the associated node in a preset time period; obtain monitoring data of the associated node, the monitoring data at least including node monitoring data of the gate station internal node and node monitoring data of the external pipeline network node; and issue an early warning notification in response to the monitoring data not satisfying a preset condition.

One of the embodiments of the present disclosure provides a non-transitory computer-readable storage medium storing computer instructions. When the computer reads the computer instructions in the storage medium, the computer executes the above-mentioned method for gas gate station monitoring based on a smart gas platform.

BRIEF DESCRIPTION OF THE DRAWINGS

The present disclosure will be further described with reference to exemplary embodiments, which will be described in detail with the accompanying drawings. These embodiments are not limiting, and the same numbering represents the same structure in these embodiments, wherein.

DETAILED DESCRIPTION

Figure 1:
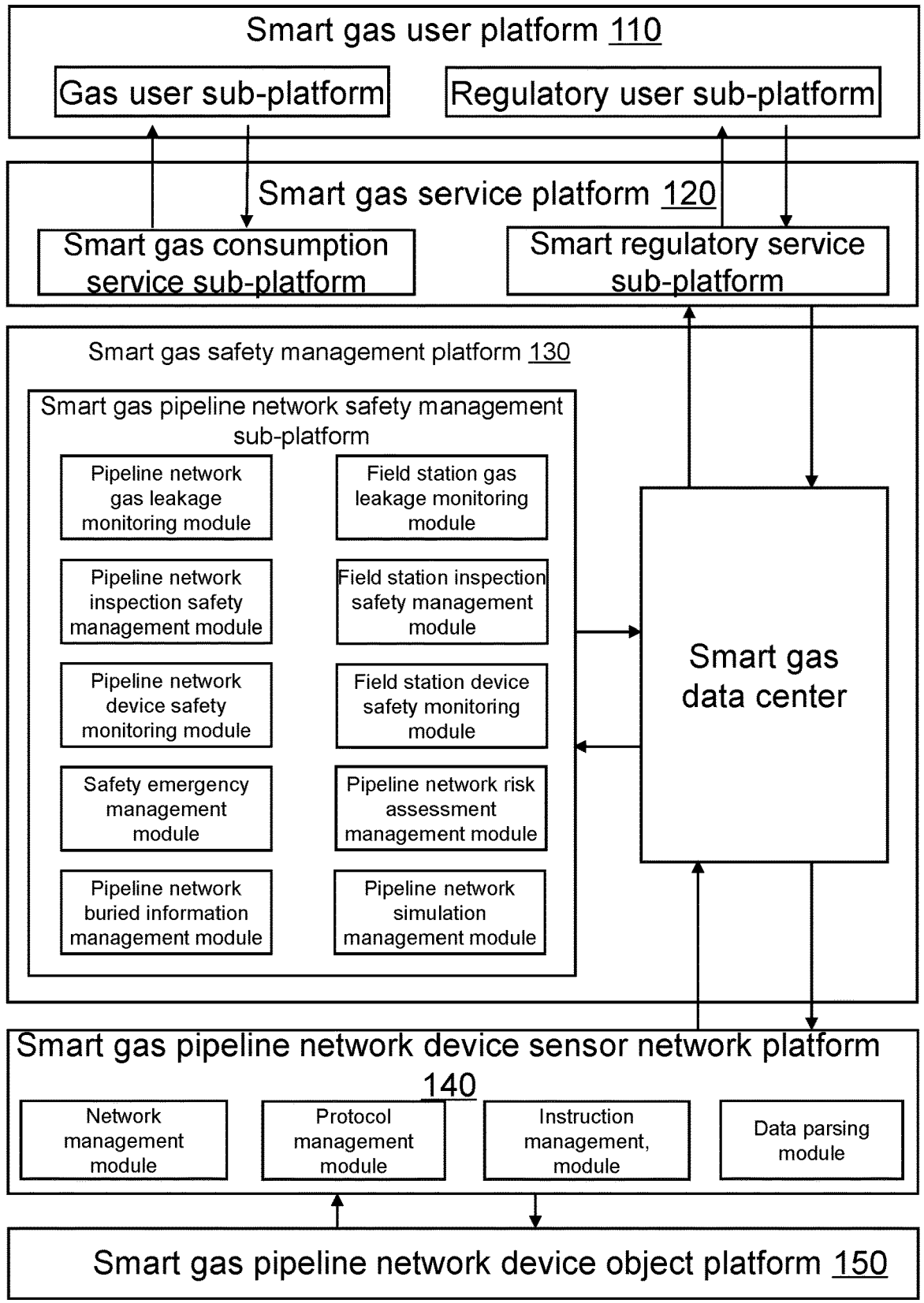
FIG. 1 is a schematic diagram illustrating a platform structure of an Internet of Things (IoT) system for gas gate station monitoring based on a smart gas platform according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those having ordinary skills in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms "system", "device", "unit" and/or "module" as used herein are a way to distinguish between different components, elements, parts, sections, or assemblies at different levels. However, other expressions may be used instead of the words if other words accomplish the same purpose.

As disclosed above in the present disclosure and the claims, unless indicated otherwise by the context, the terms "a", "an", "one", and/or "the" are not limited to singular form and may also include the plural. Generally, the terms "including" and "comprising" only include explicitly identified operations and elements. In other words, such operations and elements are not exclusive, and the method or apparatus may also include other operations or elements.

Flowcharts are used in the present disclosure to illustrate operations performed by a system in accordance with embodiments of this disclosure. It should be understood that the preceding or following operations are not necessarily performed in a specific sequence. On the contrary, the operations may be processed in reverse order or simultaneously. Moreover, additional operations may be added to these processes, or certain operation may be removed from these processes.

FIG. 1 is a schematic diagram illustrating a platform structure of an Internet of Things (IoT) system for gas gate station monitoring based on a smart gas platform according to some embodiments of the present disclosure. The IoT system for gas gate station monitoring based on a smart gas platform, disclosed in the present disclosure, will be described in detail below. It should be noted that the following embodiments are provided only for the purpose of explaining the present disclosure and do not limit the scope of the present disclosure.

In some embodiments, as shown in FIG. 1, the IoT system 100 for gas gate station monitoring based on a smart gas platform may include a smart gas user platform 110, a smart gas service platform 120, a smart gas safety management platform 130, a smart gas pipeline network device sensor network platform 140, and a smart gas pipeline network device object platform 150.

The smart gas user platform 110 may be a platform for interacting with a user. In some embodiments, the smart gas user platform 110 may be configured as a terminal device.

In some embodiments, the smart gas user platform 110 may include a gas user sub-platform and a regulatory user sub-platform.

The gas user sub-platform may be a platform that provides a gas user with data related to gas usage and a solution to a gas problem. The gas user may be an industrial gas user, a commercial gas user, an ordinary gas user, etc.

The regulatory user sub-platform may be a platform for a regulatory user to regulate an operation of the entire IoT system. The regulatory user may be personnel in a safety management department.

In some embodiments, the smart gas user platform 110 may obtain an early warning notification from the smart gas safety management platform 130 based on the regulatory user sub-platform.

The smart gas service platform 120 may be a platform used to convey user's demands and control information.

In some embodiments, the smart gas service platform 120 may obtain the early warning notification from a smart gas data center of the smart gas safety management platform 130 and send the early warning notification to the smart gas user platform 110.

In some embodiments, the smart gas service platform 120 may include a smart gas consumption service sub-platform and a smart regulatory service sub-platform.

The smart gas consumption service sub-platform may be a platform that provides a gas consumption service to the gas user.

The smart regulatory service sub-platform may be a platform that provides a regulatory need for the regulatory user.

In some embodiments, the smart gas service platform may send the early warning notification to the regulatory user sub-platform based on the smart regulatory service platform.

The smart gas safety management platform 130 may be a platform that integrates and coordinates the connection and collaboration between various functional platforms, gathers all information of the IoT, and provides perception management and control management functions for the IoT operation system.

In some embodiments, the smart gas safety management platform 130 may include a smart gas pipeline network safety management sub-platform and the smart gas data center.

The smart gas pipeline network safety management sub-platform may include different management modules such as a pipeline network inspection safety management module, a field station inspection safety management module, a pipeline network gas leakage monitoring module, a field station gas leakage monitoring module, a pipeline network device safety monitoring module, a field station device safety monitoring module, a safety emergency management module, a pipeline network risk assessment management module, a pipeline network buried information management module, a pipeline network simulation management module, and other different management modules. In business management, each management module may extract and send management data from the data center according to different business data types. The system may provide an alarm prompt when relevant monitoring data exceeds a preset threshold.

The smart gas data center may be configured to store and manage all operational information of the IoT system 100 for gas gate station monitoring based on a smart gas platform. In some embodiments, the smart gas data center may be configured as a storage device for storing data related to gas gate station monitoring. For example, the smart gas data center may store operation data of a gas gate station, monitoring data of the gas pipeline network, a downstream user feature, and historical warning data.

In some embodiments, the smart gas safety management platform 130 may interact with the smart gas service platform 120 and the smart gas pipeline network device sensor network platform 140 separately through the smart gas data center. For example, the smart gas data center may send the early warning notification to the smart gas service platform 120. For another example, the smart gas data center may send an instruction for obtaining the operation data and/or the monitoring data to the smart gas pipeline network device sensor network platform 140 to obtain the operation data of the gas gate station and/or the monitoring data of the gas pipeline network.

The smart gas pipeline network device sensor network platform 140 may be a functional platform for managing sensor communication. In some embodiments, the smart gas pipeline network device sensor network platform 140 may perform a function of sensor communication for perceptual information and controlling information.

In some embodiments, the smart gas pipeline network device sensor network platform 140 may include different management modules, such as a network management module, a protocol management module, an instruction management module, a data parsing module, etc., for obtaining the monitoring data and/or the operation data from the smart gas pipeline network device object platform 150.

The smart gas pipeline network device object platform 150 may be a functional platform for perceptual information generation and controlling information execution. For example, the smart gas pipeline network device object platform 150 may monitor and generate the operation data of the gas gate station, and the monitoring data of the gas pipeline network.

In some embodiments, the gas pipeline network device object sub-platform may be configured as various types of gas pipeline network devices and monitoring devices. For example, the gas pipeline network device may include an outdoor gas pipeline, a valve control device, a gas storage tank, a pressure regulating device, etc.; and the monitoring device may include a gas flow meter, a pressure sensor, a temperature sensor, etc.

In some embodiments of the present disclosure, by the IoT system 100 for gas gate station monitoring based on a smart gas platform, an information operation closed loop between the smart gas pipeline network device object platform and the smart gas user platform may be formed, and a coordinated and regulated operation may be achieved under a unified management of the smart gas safety management platform, thus realizing informatization and intellectualization of gas gate station monitoring and management.

It should be understood that the system and the modules shown in FIG. 1 may be implemented in various ways. It may be understood that, for those skilled in the art, after understanding the principle of the IoT system, it may be possible to freely combine various platforms or form subsystems that connect to other platforms without deviating from this principle.

Figure 2:
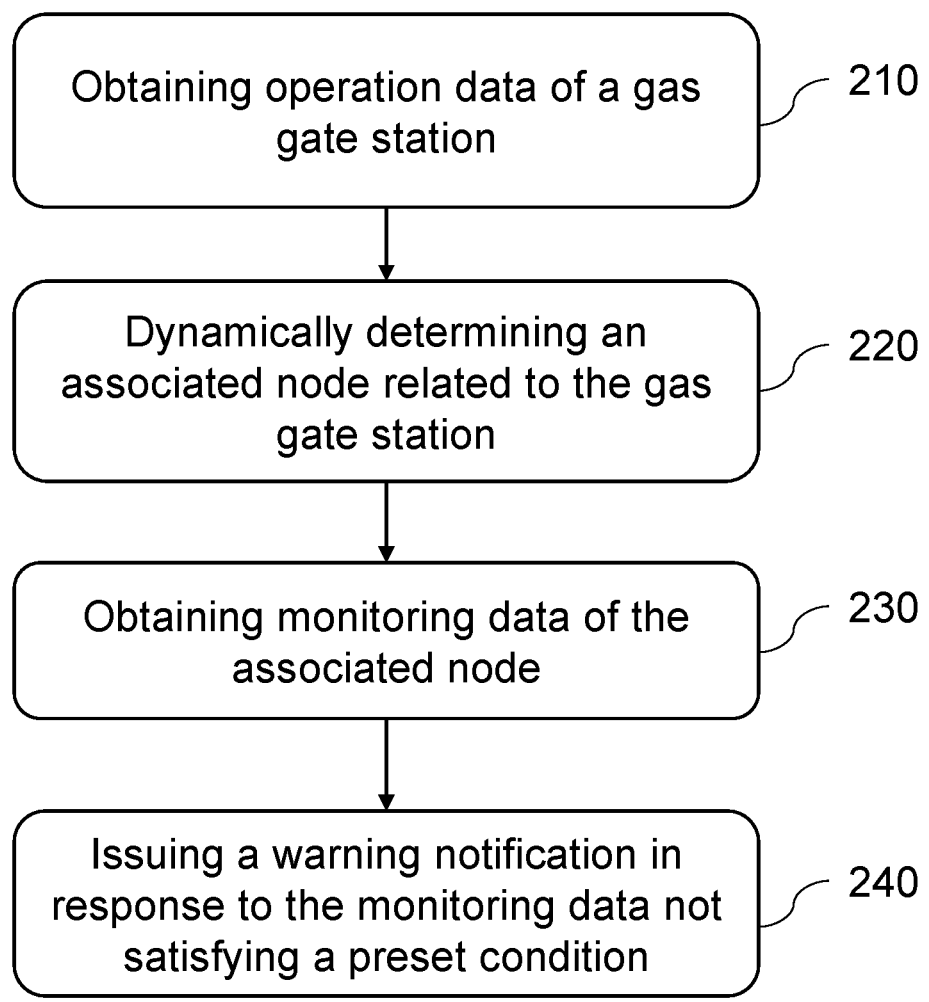
FIG. 2 is an exemplary flowchart illustrating a method for gas gate station monitoring based on a smart gas platform according to some embodiments of the present disclosure.

FIG. 2 is an exemplary flowchart illustrating a method for gas gate station monitoring based on a smart gas platform according to some embodiments of the present disclosure. As shown in FIG. 2, a process 200 may include the following operations. In some embodiments, the process 200 may be performed by a smart gas safety management platform.

In 210, obtaining operation data of a gas gate station.

The gas gate station refers to a receiving station where a gas enters a city pipeline network, i.e., a gas distribution station from a long-distance pipeline. The gas gate station may also have functions such as detection, filtration, metering, pressure regulation, heat provision, odorization, distribution, and remote telemetry/control, etc.

The operation data of the gas gate station refers to parameters associated with an operation of the gas gate station. In some embodiments, the operation data of the gas gate station may include at least one of gas flow regulation data, gas pressure rating data, odorization data, and essence data.

The gas flow regulation data refers to regulation information of gas flows of the gas gate station at different times.

The gas pressure rating data refers to regulation information of the gas gate station that adjusts gas pressures of different pipeline branches based on the gas pressure rating. The gas pressure rating indicates a pressure inside the gas pipeline, and the higher the rating, the higher the pressure inside the gas pipeline.

The odorization data refers to parameters related to an odorization operation of an odorization device on the gas. For example, a usage amount of odorizing agent, etc. The odorization operation refers to an operation of adding an odorizing agent to the gas, in order to facilitate a discovery of leakage and ensure a safety of gas delivery and use.

Purification data refers to parameters related to a purification operation of a purification device on the gas. The purification operation refers to the operation of removing impurities from the gas.

In some embodiments, the smart gas pipeline network safety management sub-platform may obtain the operation data of the gas gate station from the smart gas pipeline network device object platform based on the smart gas pipeline network device sensor network platform.

In 220, dynamically determining an associated node related to the gas gate station.

The associated node refers to a gas pipeline network node that has an association with the gas gate station. For example, a branch pipeline downstream of the gas gate station, a regulator station, a valve, etc. In some embodiments, the associated node may include at least one of a gate station internal node and an external pipeline network node.

The gate station internal node refers to a node within the gas gate station. In some embodiments, the gate station internal node may include at least one of a detection device, a pressure regulating device, an odorization device, a purification device, and a metering device.

The detection device refers to a device that detects whether there is a gas leakage inside the gas gate station. For example, the detection device may include a gas detector, etc.

The pressure regulating device refers to a device that regulates the gas pressure of the pipeline inside the gas gate station. For example, the pressure regulating device may include a gas regulator box, etc.

The odorization device refers to a device that performs odorization operations on the gas. For example, the odorization device may include an odorizing machine, etc.

The purification device refers to a device that performs purification operations on the gas. For example, the purification device may include a gas purification machine, etc.

The metering device refers to a device that counts a flow of gas. For example, the metering device may include a gas flow meter, etc.

The external pipeline network node refers to a node of an external pipeline network of the gas gate station. In some embodiments, the external pipeline network node may include a gas regulating station, a gas pipeline, and a gas valve.

The gas regulating station refers to a gas station that regulates a gas pressure in the gas pipeline and distributes the gas based on gas users.

In some embodiments, the smart gas safety management platform may obtain a downstream user feature corresponding to the gas gate station and historical warning data corresponding to the gas gate station and determine, based on the downstream user feature and the historical warning data and in combination with the operation data, the associated node in a preset time period.

The downstream user feature refers to a relevant feature of a downstream gas user associated with the gas gate station. The downstream user refers to the downstream gas user associated with the gas gate station. In some embodiments, the downstream user feature may include a user type such as a residential user, an industrial user, etc.

The historical warning data refers to the relevant information of a historical warning sent by the gas gate station to the external pipeline network node. For example, the historical warning data may include a warning frequency and a time when the warnings occurred, etc.

In some embodiments, the smart gas safety management platform may obtain the downstream user feature and the historical warning data from the smart gas data center.

In some embodiments, the smart gas safety management platform may need to dynamically determine the associated node related to the gas gate station as the associated node varies in different time periods. Here, the dynamically determining refers to determining the associated node related to the gas gate station in different time periods. For example, if an industrial user needs to use gas 24 hours a day, the corresponding upstream pipeline network node for the industrial user may always be the associated node. The residential user may use gas during the daytime, then the corresponding upstream pipeline network node for the residential user may be the associated node only during the time period when the residential user uses the gas.

In some embodiments, the smart gas safety management platform may determine the associated node related to the gas gate station by checking a first preset table. The first preset table may be determined based on prior knowledge or historical data, including at least one set of historical associated data and the associated node related to the gas gate station corresponding to each set of the historical associated data. The smart gas safety management platform may check the table based on a current downstream user feature, the historical warning data, and the operation data to determine the associated node related to the gas gate station. Here, the historical associated data may include a historical downstream user feature, the historical warning data, and historical operation data.

In some embodiments, as the gate station internal node may have different operation intensities at different times, for example, links such as flow regulation or gas purification within the gas gate station may be performed sequentially, and the operation intensities may be different for different nodes at different times, thus the dynamic operation data of the gas gate station may also affect the gate station internal node. Therefore, the smart gas safety management platform may determine the gate station internal node in the associated node based on the operation data of the gas gate station.

In some embodiments, the smart gas safety management platform may determine the gate station internal node among the associated node by checking a second preset table. The second preset table may be determined based on the prior knowledge or the historical data, and may include at least one historical operation data, and the gate station internal node in the associated node corresponding to each historical operation data. The smart gas safety management platform may check the table based on the current operation data to determine the gate station internal node in the associated node.

In 230, obtaining monitoring data of the associated node.

The monitoring data of the associated node refers to gas-related monitoring data of the associated node.

In some embodiments, the monitoring data may include at least one of metering data, pressure fluctuation data, and a gas impurity content. The metering data refers to gas flow data counted by the metering device; the pressure fluctuation data refers to data indicating changes of gas pressure in the gas pipeline; and the gas impurity content refers to data indicating a content of impurities in the gas.

In some embodiments, the monitoring data of the associated node may include gate station monitoring data of the gate station internal node, as well as gate station monitoring data of the external pipeline network node.

The gate station monitoring data of the gate station internal node refers to gas-related monitoring data of the gate station internal node. For example, the metering data, the pressure fluctuation data, and the gas impurity content, etc. of the gate station internal node.

The gate station monitoring data of the external pipeline network node refers to the gas-related monitoring data of the external pipeline network node. For example, the metering data, the pressure fluctuation data, and the gas impurity content, etc. of the external pipeline network node.

In some embodiments, the smart gas safety management platform may obtain the monitoring data of the associated node from the smart gas pipeline network device object platform based on the smart gas pipeline network device sensor network platform.

In 240, issuing an early warning notification in response to the monitoring data not satisfying a preset condition.

The preset condition refers to the condition used to determine whether the early warning notification is required to be issued. In some embodiments, the preset condition may include at least one of a value of the monitoring data being within a dynamic fluctuation range, and the value of the monitoring data being less than a dynamic threshold. The dynamic fluctuation range refers to a range of the value of the monitoring data when the associated node is operating normally. The dynamic threshold refers to a maximum value of the monitoring data when the associated node is operating normally. The dynamic fluctuation range and the dynamic threshold may be preset based on the prior knowledge or the historical data.

In some embodiments, the preset condition may include a health threshold of a pipeline network monitoring feature. The smart gas safety management platform may determine the preset condition including the health threshold based on the pipeline network monitoring feature and issue the early warning notification based on the preset condition. More relevant contents may be found in FIG. 3 of the present disclosure and the descriptions thereof.

In some embodiments, the preset condition may also include a dynamic difference threshold. The smart gas safety management platform may determine the preset condition including the dynamic difference threshold based on the gate station monitoring data and ideal operation data, and issue the early warning notification based on the preset condition. More relevant content may be found in FIG. 4 of the present disclosure and the descriptions thereof.

In some embodiments, the smart gas safety management platform may send the early warning notification to the smart gas user platform based on the smart gas safety management platform.

In some embodiments of the present disclosure, the associated node may be determined based on the operation data of the gas gate station, and subsequently, the early warning notification may be sent to the user based on the monitoring data of the associated node. This allows for the early warning notification to be sent to the user timely, thereby enabling unmanned monitoring of the gas gate station, ensuring a safe operation, and reducing labor costs.

It should be noted that the description of the process 200 provided above is merely an example and does not limit the scope of the present disclosure. For those skilled in the art, modifications, and changes to the process 200 may be made based on the guidance provided in the present disclosure. However, these modifications and changes remain within the scope of the present disclosure.

Figure 3:
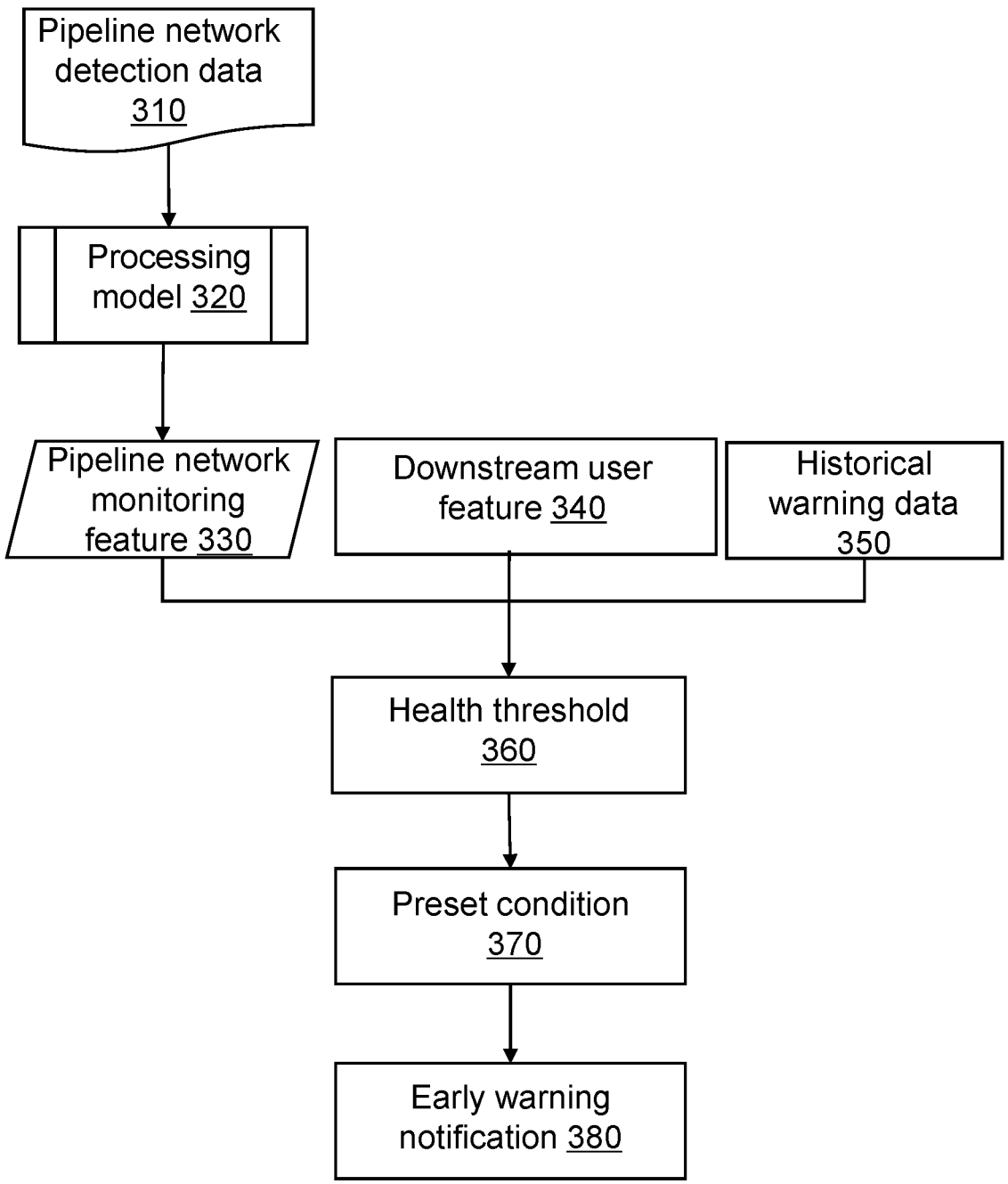
FIG. 3 is a schematic diagram illustrating a process for issuing an early warning notification according to some embodiments of the present disclosure.

FIG. 3 is a schematic diagram illustrating a process for issuing an early warning notification according to some embodiments of the present disclosure. As shown in FIG. 3, the process of issuing the early warning notification may include, but not limited to, the following operations.

In some embodiments, a smart gas safety management platform may obtain a pipeline network monitoring feature 330 based on pipeline network monitoring data 310, determine a preset condition 370 based on the pipeline network monitoring feature 330, and send the early warning notification 380 to an associated node based on the preset condition 370.

The pipeline network monitoring feature 330 may be the feature related to a gas delivery from an external pipeline network node. The pipeline network monitoring feature may be obtained from analysis and processing of pipeline network monitoring data by the smart gas safety management platform. For example, the pipeline network monitoring feature may include, but not limited to, a fluctuation range of a gas pressure, a variation range of a gas flow, and a proportion of impurities in the gas.

The pipeline network monitoring data refers to information related to the gas delivery on an associated pipeline network node. The pipeline network monitoring data may include the gas pressure, the gas flow, and a gas composition, etc. The pipeline network monitoring data may be obtained by a sensor disposed at the pipeline network node.

In some embodiments, a smart gas platform may determine the pipeline network monitoring feature based on the pipeline network monitoring data and a first preset rule. The first preset rule may be a correspondence between the pipeline network monitoring data and the pipeline network monitoring feature. The first preset rule may be taking an average value of the pipeline network monitoring data of the external pipeline network node within a fixed time period as the pipeline network monitoring feature of the node. For example, the first preset rule may be taking the average value of the pipeline network monitoring data of the external pipeline network node within 96 hours as the pipeline network monitoring feature of the node. A duration of the fixed time period may be determined based on actual demands.

In some embodiments, the smart gas platform may obtain the pipeline network monitoring feature 330 through a processing model 320 based on the pipeline network monitoring data 310.

The processing model refers to a model used to obtain the pipeline network monitoring feature. The processing model may be a machine learning model, such as a Long Short-Term Memory (LSTM) model.

An input to the processing model may include the pipeline network monitoring data of at least one external pipeline network node, and an output may include the pipeline network monitoring feature.

In some embodiments, the output of the processing model may be used as an input to a prediction model. The processing model and the prediction model may be obtained through a joint training. Descriptions of the prediction model may be found in the relevant descriptions of the present disclosure.

In some embodiments, a first sample of the joint training may include sample pipeline network monitoring data, sample gate station monitoring data, and sample gate station operation data. A first label of the training may be sample ideal operation data.

The sample pipeline network monitoring data refers to the monitoring data of the external pipeline network node in historical monitoring data; the sample gate station monitoring data refers to the monitoring data related to a gate station internal node in the historical monitoring data; and the sample gate station operation data refers to historical operation data of the gas gate station. The first sample may be obtained based on historical data.

The sample ideal operation data may be determined based on the historical operation data of the gas gate station in different historical time periods when the gate station operates normally. For example, the historical data of the gas gate station for a specific time period may be obtained, and the historical operation data that meets a similarity condition when the gas gate station is operating normally may be determined as reference data. The sample ideal operation data may be determined based on the historical operation data in the reference data. The similarity condition may include a similarity between historical gate station monitoring data, and historical gate station operation data, and the sample data being greater than a preset similarity threshold. A higher similarity indicates that the historical data and the sample data are more similar to each other. The similarity threshold may be determined based on the actual demands. The similarity may be determined based on a vector distance between the historical operation data and the sample data.

In some embodiments, a process of joint training may include inputting the sample pipeline network monitoring data into an initial processing model to obtain the pipeline network monitoring feature output by the initial processing model. The pipeline network monitoring feature may then be used as training sample data. The training sample data, along with the sample gate station monitoring data and the sample gate station operation data, may be input to the initial prediction model to obtain the ideal operation data output by the initial prediction model. A loss function may be constructed based on the sample ideal operation data and the ideal operation data output from the initial prediction model, and parameters of the initial prediction model and the initial processing model may be synchronously updated. A trained prediction model and a trained processing model may be obtained through parameter updates, and the training may be completed until a trained intermediate prediction model and a trained intermediate processing model satisfy preset condition. The preset condition may be that the loss function is less than a threshold, converges, or a training period reaches a threshold. The threshold may be preset based on the system.

Some embodiments of the present disclosure may enable quickly and efficiently determine the pipeline network monitoring feature based on a great amount of pipeline network monitoring data from the external pipeline network node through the use of the trained processing model, a reliable data support may be provided for determining a reasonable preset condition.

In some embodiments, the smart gas safety management platform may determine a dynamic threshold for the preset condition 370 based on the pipeline network monitoring feature 330. The dynamic threshold may be a numerical value or a range of numerical values. For example, the smart gas safety management platform may determine the numerical value corresponding to the dynamic threshold based on an average value of the pipeline network monitoring feature 330, and may determine the range of numerical values corresponding to the dynamic threshold based on a range of the pipeline network monitoring feature 330.

In some embodiments, the smart gas safety management platform may determine the preset condition 370 based on the pipeline network monitoring feature 330, and combined with a downstream user feature 340 and historical warning data 350.

In some embodiments, the smart gas platform may determine the preset condition based on the downstream user feature and the historical warning data by a safety factor. For example, if a historical warning frequency in the historical warning data corresponding to the downstream user feature is lower than a warning frequency threshold, the dynamic threshold of the pipeline network monitoring feature in the preset condition may be determined based on the average value of the pipeline network monitoring feature corresponding to the downstream user feature; if the historical warning frequency in the historical warning data corresponding to the downstream user feature is higher than the warning frequency threshold, the dynamic threshold of the pipeline network monitoring feature in the preset condition may be determined based on a product of the average value or the range value of the pipeline network monitoring feature corresponding to the downstream user feature and the safety factor of the pipeline network monitoring feature. The warning frequency threshold may be determined based on the average value of historical warning numbers in the historical warning data.

The safety factor may indicate a level of safety of the pipeline network node corresponding to the downstream user feature. The safety factor may be determined by checking a safety factor table. The safety factor table may indicate a correspondence between the safety factor and the historical warning data and the downstream user feature, and the safety factor table may be formulated based on the historical warning data and the downstream user feature. A staff member may determine the safety factor by checking the safety factor table based on current warning data and the downstream user feature to determine the safety factor. The safety factor may be a value between 0 and 1.

In some embodiments, the smart gas platform may also determine a health threshold 360 corresponding to a historical monitoring feature based on the downstream user feature 340 and the historical warning data 350; and determine the preset condition 370 based on the health threshold 360.

The health threshold refers to a range of pipeline network monitoring data corresponding to the downstream user whose number of failure is below a failure threshold in history. The health threshold may be a dynamically changing range. The failure threshold may be set manually based on historical failure data. For example, the failure threshold may be an average of number of failures in history, etc.

In some embodiments, the smart gas platform may determine the historical monitoring feature based on the historical monitoring data; cluster, based on the downstream user feature and the historical warning data, the historical monitoring feature, and determine the health threshold based on a clustering result.

In some embodiments, the smart gas platform may determine the historical monitoring feature based on the historical monitoring data through the trained processing model. For contents related to the processing model, please refer to the preceding disclosure.

In some embodiments, the smart gas platform may construct a historical monitoring feature vector based on the historical monitoring features corresponding to a plurality of historical time periods, clustering the historical monitoring feature vector, and determine the health threshold based on a result of the clustering. The historical time period may include a time period divided based on a manual setting. For example, the time period may be divided into 4-hour periods with 0:00 as a start time and 24:00 as an end time.

Elements of the historical monitoring feature vector may include at least one of the downstream user feature, a gas flow range, a gas pressure fluctuation range, and a weighted warning frequency.

The weighted warning frequency may be used to indicate a number of historical abnormalities. The higher the weighted warning frequency, the higher the number of abnormalities.

In some embodiments, the weighted warning frequency may be obtained based on the historical warning data. For example, the warning frequency may increase by 1 for every 1 historical early warning notification, and a different weight may be assigned to each warning. The weighted warning frequency may be determined by weighted summation.

The weight of the weighted warning frequency may be related to a frequency of historical warnings and a time of the warning occurrence. For example, when the time of the warning occurrence in history is closer to a current time, the corresponding weight may be greater.

In some embodiments, the weight of the weighted warning frequency may also be related to a proportion of warning type of the historical warnings. The warning type may include a type-one warning and a type-two warning. The type-one warning refers to warnings caused by abnormalities of the external pipeline network node, and the type-two warning refers to warnings caused by abnormalities of the gate station internal node. The proportion of warning type refers to a ratio of a number of type-two warnings to a total warning frequency. The higher the proportion of warning type, the higher the weight.

In some embodiments, the weight may also be determined based on a time interval between a time of the warning occurrence and the current time, as well as a warning proportion. For example, the weight=A*time interval+ B*warning proportion. A, B are manually preset factors. A may be a value between [−1, 0], and B may be a value between [−1, 0].

In some embodiments, the smart gas safety management platform may cluster the historical monitoring feature vectors using a clustering algorithm. For example, the smart gas safety management platform may cluster one or more historical monitoring feature vectors based on the weighted warning frequency, obtain at least one cluster center and the corresponding cluster. Each cluster may include at least one historical monitoring feature vector.

There may be various types of clustering algorithms, such as a K-Means clustering, a Density-Based Spatial Clustering of Applications with Noise (DBSCAN), etc.

In some embodiments, the smart gas safety management platform may also cluster the historical monitoring features based on other criteria to obtain the clustering result. For example, the historical detection feature may be clustered based on at least one of the downstream user feature, the gas flow range, the gas pressure fluctuation range, or the weighted warning frequency. This process may be similar to the clustering based on the weighted warning frequency, as described earlier.

In some embodiments, if the proportion of the warning frequency exceeds a proportional threshold, it indicates that an abnormality in the gate station node is more likely to cause an abnormality in the pipeline network monitoring feature. Therefore, it may be necessary to set a smaller health threshold to more sensitively sense risks caused by internal abnormalities in the gas gate station. The proportional threshold may be determined based on the actual demands.

In some embodiments, the smart gas platform may determine the health threshold based on an average of the pipeline network monitoring features of a target cluster in the clustering results. The target cluster may be a cluster whose weighted warning frequency meets a preset warning frequency condition. The preset warning frequency condition may include the warning frequency does not exceed a threshold.

When there is a significant difference between the plurality of health thresholds obtained and a preset standard value, the smart gas platform may determine the health thresholds obtained from the clustering to be inaccurate and issue the corresponding early warning notification.

Some embodiments of the present disclosure divide and determine the preset conditions for different time periods by means of clustering, which adaptively and reliably assess the pipeline network feature in different time periods and more sensitively sense external problems caused by internal failures of the gas gate station, thereby meeting early warning demands of different types of gas users.

Some embodiments of the present disclosure may determine the preset condition based on the pipeline network monitoring data and issue the corresponding early warning notification. Dynamic monitoring and regulation of nodes in the gas pipeline network may help to more efficiently identify abnormal pipeline network nodes and issue early warning notifications timely.

Figure 4:
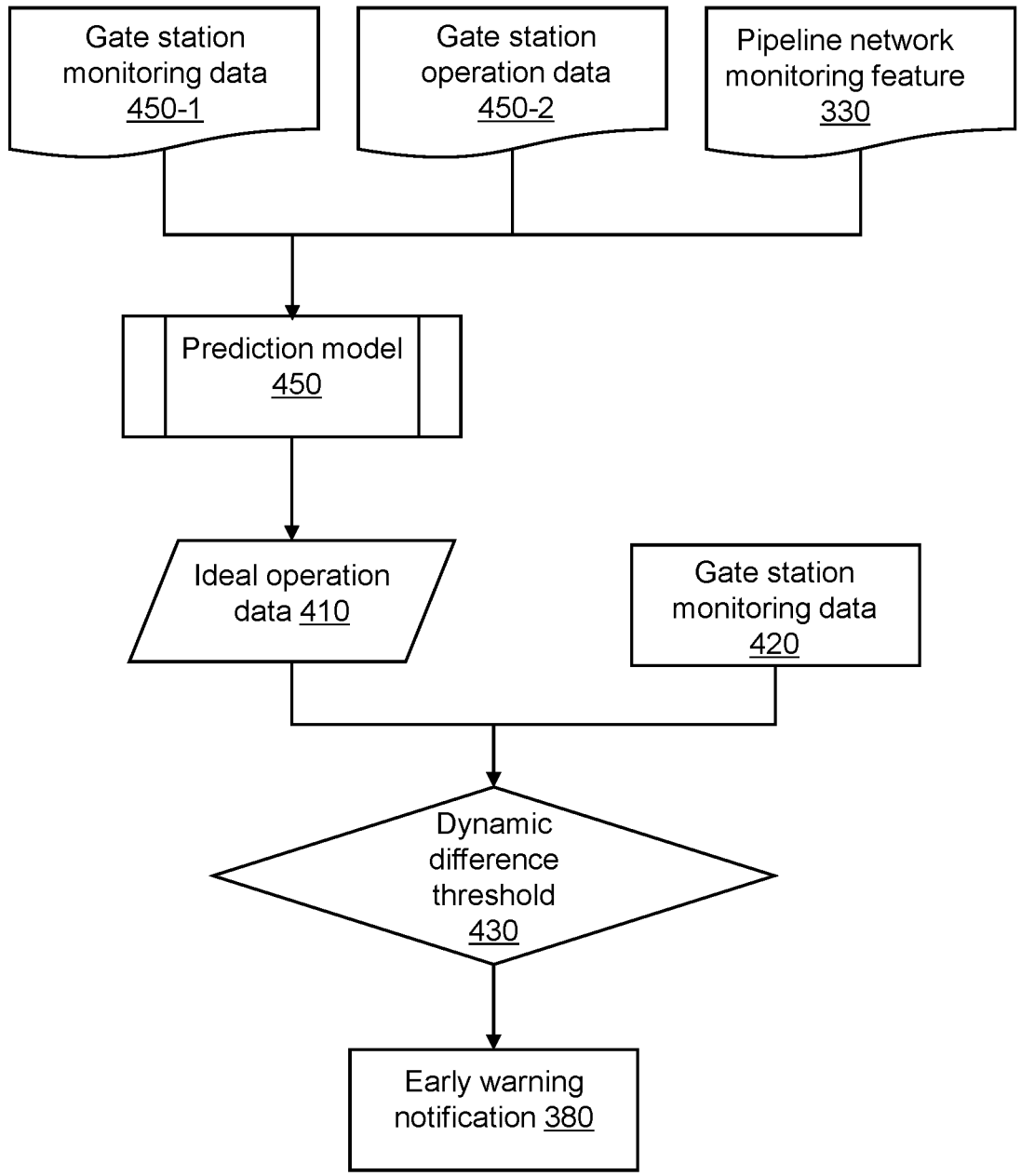
FIG. 4 is a schematic diagram illustrating another process for issuing an early warning notification according to some embodiments of the present disclosure.

FIG. 4 is a schematic diagram illustrating another method for issuing an early warning notification according to some embodiments of the present disclosure. As shown in FIG. 4, a process of issuing the early warning notification may include the following contents.

In some embodiments, a smart gas safety management platform may determine ideal operation data 410 for a gas gate station at a future time. In response to a difference between gate station monitoring data 420 and the ideal operation data 410 exceeding a dynamic difference threshold 430, an early warning notification 380 may be issued.

The ideal operation data refers to a standard value of operation data during a normal operation of the gas gate station. The ideal operation data may correspond to a range of standard values for the operation data.

The ideal operation data at a future time refers to a standard value of the operation data for a future preset time period. The future preset time period may be determined based on actual management demands. For example, if there is a need to focus on monitoring the operation in the next 24 hours, the corresponding future preset time period may be 24 hours.

In some embodiments, the smart gas safety management platform may determine the ideal operation data based on historical data. Exemplarily, the smart gas safety management platform may construct a reference operation database based on the historical data. The reference operation database may include a plurality of data sets, each data set including an historical time period of operation without abnormality and corresponding historical time feature, as well as the reference operation data corresponding to the historical time period. The smart gas safety management platform may retrieval in the reference operation database based on a time feature of the future preset time period and determine at least one data set that meets a reference condition. Then, the smart gas safety management platform may determine, based on the reference operation data corresponding to the at least one data set, the ideal operation data. For example, an average value of the reference operation data may be determined as the ideal operation data.

The time feature may include a season in which the time period falls, a temperature corresponding to the time period, a time range for the time period, etc. Based on the time feature, the smart gas safety management platform may determine a historical time period in the reference operation database that is more similar to the future preset time period to be determined. Based on the more similar historical time period, more informative reference operation data may be obtained.

In some embodiments, the smart gas safety management platform may also determine the ideal operation data 410 based on a prediction model 450. The prediction model may be a machine learning model.

In some embodiments, an input to the prediction model may at least include gate station monitoring data 450-1, and gate station operation data 450-2, and an output may include the ideal operation data 410.

The gate station monitoring data refers to data obtained by detecting an environment of the gas gate station.

In some embodiments, the gate station monitoring data may at least include noise intensity data of the gas gate station, and a node temperature of a gate station internal node. The noise intensity data may be obtained from a sound sensor placed at the gas gate station, and the node temperature may be obtained based on a temperature sensor placed at the gate station internal node.

The gate station operation data refers to data related to the operation of the gas gate station.

In some embodiments, the gate station operation data may at least include initial gas data. The initial gas data refers to data for a raw, unprocessed gas. For example, the initial gas data may include a gas type, a gas impurity content, a moisture content, etc. The gas type may include a natural gas, a liquefied petroleum gas, a coal gas, a mixed gas, etc.

In some embodiments, the smart gas safety management platform may obtain the initial gas data from a smart gas pipeline network device object platform through a smart gas device sensor network platform.

In some cases, changes at a downstream of the gas pipeline network may affect an upstream. For example, if there is a pipeline leakage at downstream, a pressure of the pipeline may change, and a corresponding regulator pressure of the upstream gas gate station to which the pipeline belongs may also change. Therefore, downstream monitoring data may be used as a reference for determining whether there is an abnormality in the operation of the gas gate station, so as to more comprehensively and systematically determine the results of the determination, and improve an accuracy of the determination.

In some embodiments, the input to the prediction model may also include the pipeline network monitoring feature 330. The pipeline network monitoring feature may be used to indicate a feature of pipelines downstream of the gas pipeline network, for more related contents, please refer to the related descriptions in FIG. 3 of the present disclosure.

In some embodiments, the smart gas safety management platform may train an initial prediction model based on a plurality of second samples with second labels to obtain a trained prediction model. For example, the second samples may be input to the initial prediction model, and a loss function may be constructed based on an output of the initial prediction model and the second labels; based on the loss function, parameters in the initial prediction model may be iteratively updated until a preset condition is satisfied, the training ends, and the trained prediction model may be obtained. The preset condition may include a convergence of the loss function, a number of iterations reaches a threshold, etc.

In some embodiments, the second sample may include sample current monitoring data, sample historical monitoring data, sample monitoring feature, and sample operation data. The second sample may be determined based on the historical data.

In some embodiments, the second label may include sample ideal operation data. The second label may be determined based on the operation data when the gas gate station operates normally in the historical data.

In some embodiments, the prediction model and the processing model may be obtained by joint training, and for more related contents, please refer to the related description in FIG. 3 of the present disclosure.

In some embodiments, the smart gas safety management platform may determine whether to issue the early warning notification based on a difference between the gas gate station monitoring data and the ideal operation data. For example, in response to the difference between the gate station monitoring data and the ideal operation data exceeding a dynamic difference threshold, the early warning notification may be issued. The difference between the gate station monitoring data and the ideal operation data may be a numerical difference, for example, the smart gas safety management platform may determine the difference between the gate station monitoring data and the ideal operation data based on a difference value between the gate station monitoring data and the ideal operation data.

More descriptions of the dynamic difference threshold may be found in the relevant description in FIG. 2 of the present disclosure.

In some embodiments, the smart gas safety management platform may send the early warning notification to the smart gas user platform through the smart gas service platform.

In some embodiments of the present disclosure, through a trained prediction model, the ideal operation data may be quickly and accurately obtained for reference; by considering the features of the external pipeline network node and the gate station internal node, the abnormalities of the gas pipeline network may be more comprehensively assessed, thereby satisfying the requirements of an automated, intelligent, and unmanned monitoring of the gas gate station and improving monitoring efficiency and accuracy.

Some embodiments of the present disclosure further include a non-transitory computer-readable storage medium storing computer instructions, and when reading the computer instructions in the storage medium, the computer executes the method for gas gate station monitoring based on a smart gas platform.

The basic concepts have been described above, and it may be apparent to those skilled in the art that the detailed disclosure provided above is intended as an example only and does not constitute a limitation of the present disclosure. While not expressly stated herein, various modifications, improvements, and amendments may be made to the present disclosure by those skilled in the art. Such modifications, improvements, and amendments are suggested in the present disclosure, and therefore, they remain within the spirit and scope of the exemplary embodiments of the present disclosure.

Also, the present disclosure uses specific terms to describe embodiments of the present disclosure. For example, "an embodiment", "one embodiment", and/or "some embodiments" refer to a feature, structure, or characteristic associated with at least one embodiment of the present disclosure. Therefore, it should be emphasized and noted that "one embodiment", "an embodiment", or "an alternative embodiment" mentioned at different places in the present disclosure may not necessarily refer to the same embodiment. In addition, certain features, structures, or characteristics in one or more embodiments of the present disclosure may be suitably combined.

Additionally, the order of processing elements and sequences, the use of numerical letters, or the use of other names described herein are not intended to limit the order of the processes and methods of the present disclosure, unless expressly stated in the claims. While some embodiments of the invention that are currently considered useful are discussed in the foregoing disclosure by way of various examples, it should be appreciated that such details serve only illustrative purposes, and that the appended claims are not limited to the disclosed embodiments, but rather, the claims are intended to cover all amendments and equivalent combinations that are consistent with the substance and scope of the embodiments of the present disclosure. For example, although the embodiment of various components described above may be embodied in a hardware device, it may also be implemented as a software only solution, e.g., install the described system on an existing server or mobile device Similarly, it should be noted that in order to simplify the disclosure of the present disclosure and aid in the understanding of one or more embodiments of the present disclosure, the foregoing descriptions of embodiments of the present disclosure sometimes group multiple features together in a single embodiment, accompanying drawings, or a description thereof. However, the mode of disclosure does not imply that the objects of the present disclosure require more features than those mentioned in the claims. Rather, the claimed subject matter may lie in less than all the features of a single disclosed embodiment.

Some embodiments use numbers to describe the quantity of components and attributes, and it should be understood that such numbers, used in the description of an embodiment, are modified in some embodiments by the modifiers "about," "approximately," or "substantially." Unless otherwise noted, the terms "about," "approximately," or "substantially" indicate that a variation of ±20% in the stated number is allowed. Correspondingly, in some embodiments, the numerical parameters used in the present disclosure and the claims are approximations, which may vary depending on the desired features of individual embodiments. In some embodiments, the numerical parameters should consider the specified number of significant digits and employ general rounding practices. While the numerical ranges and parameters used to confirm a width of their ranges in some embodiments of the present disclosure are approximations, in specific embodiments, such values are set to be as precise as possible within a feasible range.

For each patent, patent application, patent application publication, and other material cited in the present disclosure, such as articles, books, manuals, publications, documents, etc., the entire contents of which are hereby incorporated by reference in their entirety. Except for application history documents that are inconsistent with or create a conflict with the contents of the present disclosure, and except for documents that limit the broadest scope of the claims of the present disclosure (currently or hereafter appended to the present disclosure). It should be noted that in the event of any inconsistency or conflict between the descriptions, definitions, and/or use of terminology in the materials appended to the present disclosure and those set forth in the present disclosure, the descriptions, definitions, and/or use of terminology in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for gas gate station monitoring based on a smart gas platform, implemented by a smart gas safety management platform, comprising:
   obtaining operation data of a gas gate station;
   dynamically determining an associated node related to the gas gate station, the associated node including at least one of a gate station internal node and an external pipeline network node; wherein the dynamically determining an associated node related to the gas gate station includes:
   obtaining a downstream user feature corresponding to the gas gate station and historical warning data corresponding to the gas gate station; and
   determining, based on the downstream user feature and the historical warning data and in combination with the operation data, the associated node in a preset time period;
   obtaining monitoring data of the associated node, the monitoring data at least including node monitoring data of the gate station internal node and node monitoring data of the external pipeline network node; and
   issuing an early warning notification in response to the monitoring data not satisfying a preset condition.

2. The method of claim 1, wherein the issuing an early warning notification in response to the monitoring data not satisfying a preset condition comprises:
   obtaining a pipeline network monitoring feature based on a pipeline network monitoring data;
   determining the preset condition based on the pipeline network monitoring issuing the early warning notification to the associated node based on the preset condition.

3. The method of claim 2, wherein the pipeline network monitoring feature is determined through processing the pipeline network monitoring data using a processing model, the processing model being a machine learning model.

4. The method of claim 2, wherein the determining the preset condition based on the pipeline network monitoring feature comprises:
   determining, based on the pipeline network monitoring feature and in combination of the downstream user feature and the historical warning data, the preset condition.

5. The method of claim 1, wherein the preset condition includes a dynamic difference threshold; and
   the issuing an early warning notification in response to the monitoring data not satisfying a preset condition comprises:
   determining ideal operation data of the gas gate station at a future time; and
   issuing the early warning notification in response to a difference between gate station monitoring data and the ideal operation data exceeding the dynamic difference threshold.

6. An Internet of Things (IoT) system for gas gate station monitoring based on a smart gas platform, wherein the IoT system includes a smart gas user platform, a smart gas service platform, a smart gas safety management platform, a smart gas pipeline network device sensor network platform, and a smart gas pipeline network device object platform;
   the smart gas safety management platform is configured to:
   obtain operation data of a gas gate station;
   dynamically determine an associated node related to the gas gate station, the associated node including at least one of a gate station internal node and an external pipeline network node;
   wherein to dynamically determine an associated node related to the gas gate station, the smart gas safety management platform is further configured to:
   obtain a downstream user feature corresponding to the gas gate station and historical warning data corresponding to the gas gate station; and
   determine, based on the downstream user feature and the historical warning data and in combination with the operation data, the associated node in a preset time period;
   obtain monitoring data of the associated node, the monitoring data at least including node monitoring data of the gate station internal node and node monitoring data of the external pipeline network node; and
   issue an early warning notification in response to the monitoring data not satisfying a preset condition.

7. The IoT system of claim 6, wherein the smart gas safety management platform includes a smart gas pipeline network safety management sub-platform and a smart gas data center; wherein
   the smart gas safety management exchanges information with the smart gas service platform and a smart gas pipeline line network device sensor network platform through the smart gas data center.

8. The IoT system of claim 7, wherein the smart gas safety management platform is further configured to:
   obtain a pipeline network monitoring feature based on a pipeline network monitoring data;
   determine the preset condition based on the pipeline network monitoring feature; and
   issue the early warning notification to the associated node based on the preset condition.

9. The IoT system of claim 8, wherein the smart gas safety management platform is further configured to:
   determine, based on the pipeline network monitoring feature and in combination of the downstream user feature and the historical warning data, the preset condition.

10. The IoT system of claim 7, wherein the preset condition includes a dynamic difference threshold; and
    the smart gas safety management platform is further configured to:
    determine ideal operation data of the gas station at a future time; and
    issue the early warning notification in response to a difference between gate station monitoring data and the ideal operation data exceeding the dynamic difference threshold.

* * * * *